United States Patent
Kang et al.

(10) Patent No.: US 12,518,929 B2
(45) Date of Patent: Jan. 6, 2026

(54) MULTILAYER CERAMIC CAPACITOR AND METHOD OF PREPARING THE SAME

(71) Applicant: SAMSUNG ELECTRO-MECHANICS CO., LTD., Suwon-si (KR)

(72) Inventors: Bumsuk Kang, Suwon-si (KR); Da Mi Kim, Suwon-si (KR); Daewoo Yoon, Suwon-si (KR); Sujin Lee, Suwon-si (KR); Junghyun Kim, Suwon-si (KR); Jeong Ryeol Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 126 days.

(21) Appl. No.: 18/626,919

(22) Filed: Apr. 4, 2024

(65) Prior Publication Data
US 2025/0210270 A1    Jun. 26, 2025

(30) Foreign Application Priority Data
Dec. 26, 2023  (KR) .................. 10-2023-0190793

(51) Int. Cl.
*H01G 4/232* (2006.01)
*H01G 4/248* (2006.01)
*H01G 4/30* (2006.01)

(52) U.S. Cl.
CPC ........... *H01G 4/2325* (2013.01); *H01G 4/248* (2013.01); *H01G 4/30* (2013.01)

(58) Field of Classification Search
CPC ........ H01G 4/2325; H01G 4/248; H01G 4/30; H01G 4/0085; H01G 4/1209; H01G 4/012; H01G 4/232; H01G 13/00; Y02E 60/13
See application file for complete search history.

(56) References Cited

U.S. PATENT DOCUMENTS

| | | | | |
|---|---|---|---|---|
| 7,140,097 | B2* | 11/2006 | Furukawa | H01G 4/30 338/195 |
| 8,962,506 | B2* | 2/2015 | Kim | H01G 4/008 501/138 |
| 2004/0064940 | A1* | 4/2004 | Furukawa | H01C 7/008 361/708 |

(Continued)

FOREIGN PATENT DOCUMENTS

| | | | | |
|---|---|---|---|---|
| EP | 2234128 A1 * | 9/2010 | | H01G 4/40 |
| JP | 6911755 B2 | 7/2021 | | |

(Continued)

*Primary Examiner* — Dion R. Ferguson
(74) *Attorney, Agent, or Firm* — Morgan Lewis & Bockius LLP

(57) ABSTRACT

A multilayer ceramic capacitor, including a capacitor body including a dielectric layer and an internal electrode layer, and an external electrode disposed outside of the capacitor body, wherein the external electrode includes an electrode layer disposed directly on a cross-section of the capacitor body to be electrically connected to at least one of the internal electrode layers, the electrode layer includes a conductive metal, and a glass including cobalt (Co), and cobalt (Co) is included in an amount of 0.13 parts by weight to 0.64 parts by weight based on 100 parts by weight of the conductive metal. A method of manufacturing the multilayer ceramic capacitor.

20 Claims, 6 Drawing Sheets

(56) References Cited

U.S. PATENT DOCUMENTS

| | | |
|---|---|---|
| 2005/0248908 A1 | 11/2005 | Dreezen et al. |
| 2011/0214908 A1* | 9/2011 | Kaneko .................. C04B 35/47 |
| | | 174/257 |
| 2023/0207214 A1 | 6/2023 | Doi |
| 2025/0210270 A1* | 6/2025 | Kang .................. H01G 4/2325 |

FOREIGN PATENT DOCUMENTS

| | | |
|---|---|---|
| JP | 2023-093942 A | 7/2023 |
| KR | 10-2006-0047733 A | 5/2006 |

\* cited by examiner

MULTILAYER CERAMIC CAPACITOR AND METHOD OF PREPARING THE SAME

CROSS-REFERENCE TO RELATED APPLICATION

This application claims priority to and the benefit of Korean Patent Application No. 10-2023-0190793 filed in the Korean Intellectual Property Office on Dec. 26, 2023, the entire contents of which are incorporated herein by reference.

BACKGROUND

(a) Technical Field

The present disclosure relates to a multilayer ceramic capacitor and a method of manufacturing the same.

(b) Description of the Related Art

As electronic components using a ceramic material, there are a capacitor, an inductor, a piezoelectric element, a varistor, a thermistor, and the like. Among ceramic electronic components, a multilayer ceramic capacitor (MLCC) may be used in various electronic devices due to advantages such as a small size, a high capacity, an easy mounting feature, and the like.

For example, a multilayer ceramic capacitor may be used in a chip type condenser mounted on a board of several electronic products such as image devices, for example, liquid crystal displays (LCD), plasma display panels (PDP), or the like, computers, personal portable terminals, smartphones, and the like, to serve to charge or discharge electricity therein or therefrom.

Recently, as electronic products have been miniaturized, multilayer ceramic capacitors have also been demanded to be miniaturized and ultra-high capacity. To this end, multilayer ceramic capacitors including dielectric layers and internal electrode layers having relatively reduced thickness to be able to have a structure in which relatively large amount of dielectric layers and internal electrode layers are stacked have been manufactured. The miniaturized and ultra-high capacity multilayer ceramic capacitors have been recently used in fields that require a high level of reliability, such as electric vehicles, and accordingly, high reliability is required.

SUMMARY

An embodiment according to the present disclosure attempts to provide a multilayer ceramic capacitor with excellent moisture resistance reliability as well as connectivity between internal and external electrodes.

Another embodiment provides a method of manufacturing the multilayer ceramic capacitor.

An embodiment provides a multilayer ceramic capacitor, including a capacitor body including a dielectric layer and an internal electrode layer, and an external electrode disposed outside of the capacitor body, the external electrode including an electrode layer disposed directly on a cross-section of the capacitor body to be electrically connected to at least one of the internal electrode layers, the electrode layer including a conductive metal, and a glass including cobalt (Co), wherein cobalt (Co) is included in an amount of 0.13 parts by weight to 0.64 parts by weight based on 100 parts by weight of the conductive metal.

Cobalt (Co) may be included in an interface near region, which is defined as a region from an interface between the electrode layer of the external electrode and the internal electrode layer to a point that is 5% to 15% of a total thickness of the external electrode in a length direction (L axis).

The glass may further include iron (Fe).

Iron (Fe) may be included in an amount of 0.18 parts by weight to 0.91 parts by weight based on 100 parts by weight of the conductive metal.

Iron (Fe) may be included in an interface near region, which is defined as a region from an interface between the electrode layer of the external electrode and the internal electrode layer to a point that is 5% to 15% of a total thickness of the external electrode in a length direction (L axis).

The glass may further include lithium (Li), potassium (K), silicon (Si), aluminum (Al), nickel (Ni), silver (Ag), sodium (Na), barium (Ba), calcium (Ca), strontium (Sr), boron (B), zinc (Zn), tin (Sn), copper (Cu), indium (In), titanium (Ti), phosphorus (P), manganese (Mn), germanium (Ge) or a combination thereof.

Based on a total amount of glass, lithium (Li) may be included in an amount of 5 wt % 20 wt %, potassium (K), if present, may be included in an amount of 5 wt % to 20 wt %, silicon (Si) may be included in an amount of 5 wt % to 20 wt %, aluminum (Al) may be included in an amount of 5 wt % to 15 wt %, nickel (Ni) may be included in an amount of 0.01 wt % to 20 wt %, silver (Ag) may be included in an amount of 0.01 wt % to 15 wt %, sodium (Na) may be included in an amount of 0.01 wt % to 25 wt %, barium (Ba) may be included in an amount of 15 wt % to 45 wt %, calcium (Ca), if present, may be included in an amount of 15 wt % to 45 wt %, strontium (Sr), if present, may be included in an amount of 15 wt % to 45 wt %, boron (B) may be included in an amount of 15 wt % 25 wt %, zinc (Zn) may be included in an amount of 1 wt % to 15 wt %, tin (Sn) may be included in an amount of 0.01 wt % to 15 wt %, copper (Cu) may be included in an amount of 0.01 wt % to 15 wt %, indium (In) may be included in an amount of 0.01 wt % to 15 wt %, titanium (Ti) may be included in an amount of 0.01 wt % to 15 wt %, phosphorus (P) may be included in an amount of 0.01 wt % to 15 wt %, manganese (Mn) may be included in an amount of 0.01 wt % to 15 wt %, and germanium (Ge) may be included in an amount of 0.01 wt % to 15 wt %.

The glass may be included in an amount of 1 parts by weight to 40 parts by weight based on 100 parts by weight of the conductive metal.

An average particle diameter D50 of the glass may be 0.1 µm to 5 µm.

The conductive metal may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof.

The conductive metal may include copper (Cu), the glass may be included in an amount of 1 parts by weight to 40 parts by weight based on 100 parts by weight of the conductive metal, and the glass may further include lithium (Li), silicon (Si), aluminum (Al), nickel (Ni), silver (Ag), sodium (Na), barium (Ba), boron (B), zinc (Zn), tin (Sn), copper (Cu), indium (In), titanium (Ti), phosphorus (P), manganese (Mn), and germanium (Ge).

Another embodiment provides a method of manufacturing a multilayer ceramic capacitor, including applying a paste for forming an electrode layer to one surface of a capacitor body including a dielectric layer and an internal electrode layer, wherein the paste includes a conductive metal and glass composition, and sintering the paste to form the electrode layer of an external electrode, wherein the glass composition includes cobalt oxide (CoO) in an amount of 0.13 parts by weight to 0.64 parts by weight based on 100 parts by weight of the conductive metal.

The sintering may be performed at a temperature of 400° C. to 850° C.

The glass composition may further include iron oxide, and iron oxide may include FeO, $Fe_2O_3$, $Fe_3O_4$, or a combination thereof.

Iron oxide may be included in an amount of 0.18 parts by weight to 0.91 parts by weight based on 100 parts by weight of the conductive metal.

The glass composition may further include lithium oxide ($Li_2O$); potassium oxide ($K_2O$); silicon dioxide ($SiO_2$); aluminum oxide ($Al_2O_3$); nickel oxide (NiO); silver oxide ($Ag_2O$); sodium oxide (NaO); barium oxide (BaO); calcium oxide (CaO); strontium oxide (SrO); boron oxide ($B_2O_3$); zinc oxide (ZnO); tin oxide including SnO, $SnO_2$, or a combination thereof; copper oxide including $Cu_2O$, CuO, or a combination thereof; indium oxide ($In_2O_3$); titanium dioxide ($TiO_2$); phosphorus pentoxide ($P_2O_5$); manganese oxide including MnO, $Mn_2O$, $Mn_2O_3$, $Mn_3O_4$, or a combination thereof; germanium oxide ($GeO_2$); or a combination thereof.

Based on a total amount of the glass composition, lithium oxide ($Li_2O$) may be included in an amount of 5 wt % to 20 wt %, potassium oxide ($K_2O$), if present, may be included in an amount of 5 wt % to 20 wt %, silicon dioxide ($SiO_2$) may be included in an amount of 5 wt % to 20 wt %, aluminum oxide ($Al_2O_3$) may be included in an amount of 5 wt % to 15 wt %, nickel oxide (NiO) may be included in an amount of 0.01 wt % to 20 wt %, silver oxide ($Ag_2O$) may be included in an amount of 0.01 wt % to 15 wt %, sodium oxide (NaO) may be included in an amount of 0.01 wt % to 25 wt %, barium oxide (BaO) may be included in an amount of 15 wt % to 45 wt %, calcium oxide (CaO), if present, may be included in an amount of 15 wt % to 45 wt %, strontium oxide (SrO), if present, may be included in an amount of 15 wt % to 45 wt %, boron oxide ($B_2O_3$) may be included in an amount of 15 wt % to 25 wt %, zinc oxide (ZnO) may be included in an amount of 1 wt % to 15 wt %, tin oxide may be included in an amount of 0.01 wt % to 15 wt %, copper oxide may be included in an amount of 0.01 wt % to 15 wt %, indium oxide ($In_2O_3$) may be included in an amount of 0.01 wt % to 15 wt %, titanium dioxide ($TiO_2$) may be included in an amount of 0.01 wt % to 15 wt %, phosphorus pentoxide ($P_2O_5$) may be included in an amount of 0.01 wt % to 15 wt %, manganese oxide may be included in an amount of 0.01 wt % to 15 wt %, and germanium oxide ($GeO_2$) may be included in an amount of 0.01 wt % to 15 wt %.

The glass composition may be included in an amount of 1 parts by weight to 40 parts by weight based on 100 parts by weight of the conductive metal. The conductive metal may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof.

The conductive metal may include copper (Cu), the glass composition may be included in an amount of 1 parts by weight to 40 parts by weight based on 100 parts by weight of the conductive metal, and the glass composition may further include lithium oxide ($Li_2O$); silicon dioxide ($SiO_2$); aluminum oxide ($Al_2O_3$); nickel oxide (NiO); silver oxide ($Ag_2O$); sodium oxide (NaO); barium oxide (BaO); boron oxide ($B_2O_3$); zinc oxide (ZnO); tin oxide including SnO, $SnO_2$, or a combination thereof; copper oxide including $Cu_2O$, CuO, or a combination thereof; indium oxide ($In_2O_3$); titanium dioxide ($TiO_2$); phosphorus pentoxide ($P_2O_5$); manganese oxide including MnO, $Mn_2O$, $Mn_2O_3$, $Mn_3O_4$, or a combination thereof; and germanium oxide ($GeO_2$).

The multilayer ceramic capacitor according to an embodiment includes an external electrode having excellent connectivity with the internal electrode layer, thereby improving moisture resistance reliability.

DETAILED DESCRIPTION OF THE EMBODIMENTS

Figure 1:
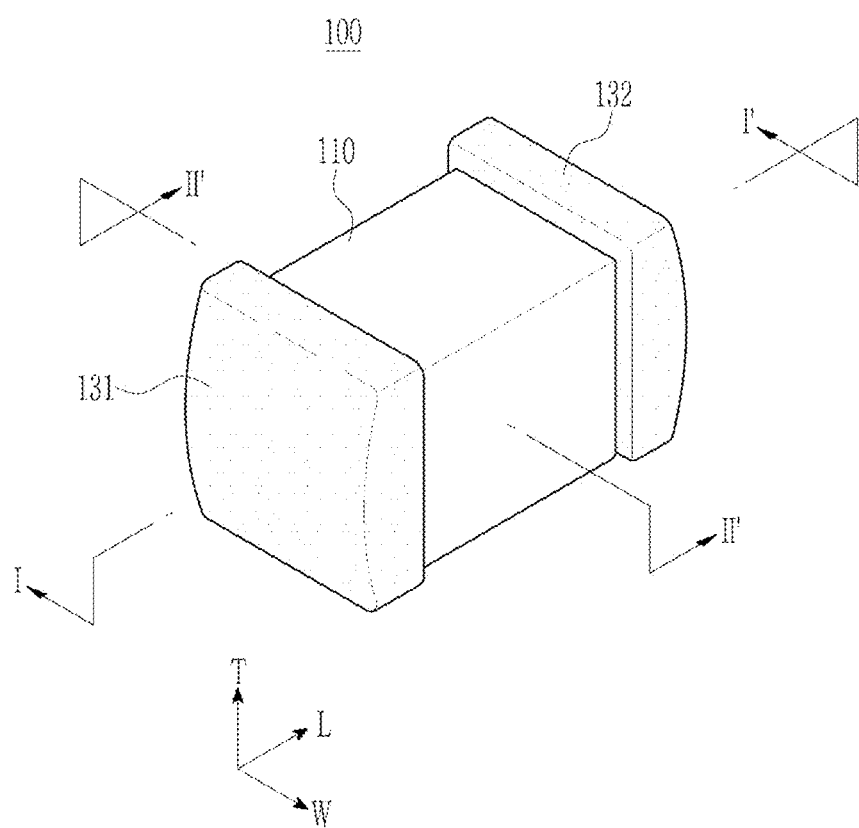
FIG. 1 is a perspective view showing a multilayer ceramic capacitor according to an embodiment.

Hereinafter, the present disclosure will be described in detail hereinafter with reference to the accompanying drawings, in which embodiments of the present disclosure are shown. The drawings and description are to be regarded as illustrative in nature and not restrictive. Like reference numerals designate like elements throughout the specification. In the accompanying drawings, some constituent elements are exaggerated, omitted, or schematically illustrated, and the size of each constituent element does not entirely reflect the actual size.

The accompanying drawings are intended only to facilitate an understanding of the exemplary embodiments disclosed in this specification, and it is to be understood that the technical ideas disclosed herein are not limited by the accompanying drawings and include all modifications, equivalents, or substitutions that are within the range of the ideas and technology of the present disclosure.

Although terms of "first," "second," and the like are used to explain various constituent elements, the constituent elements are not limited to such terms. These terms are only used to distinguish one constituent element from another constituent element.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, when an element is referred to as being "on" or "above" a reference element, it can be positioned above or below the reference element, and it is not necessarily referred to as being positioned "on" or "above" in a direction opposite to gravity.

Throughout the specification, the terms "comprise" or "have" are intended to specify the presence of stated features, integers, steps, operations, constituent elements, components or a combination thereof, but do not preclude the presence or addition of one or more other features, integers, steps, operations, constituent elements, components, and/or groups thereof. Therefore, unless explicitly described to the contrary, the term "comprise" and variations such as "comprises" or "comprising" will be understood to imply the inclusion of stated elements but not the exclusion of any other elements.

In addition, the phrase "on a plane" means a view from a position above the object (e.g., from the top), and the phrase "on a cross-section" means a view of a cross-section of the object which is vertically cut from the side.

Throughout the specification, the term "connected" does not mean only that two or more constituent components are directly connected, but may also mean that two or more constituent components are indirectly connected through another constituent component, that two or more components are electrically connected as well as physically connected, or that two or more constituent components are referred to by different names but are united by location or function.

Hereinafter, a multilayer ceramic capacitor according to an embodiment will be described with reference to FIGS. 1 to 3.

Figure 2:
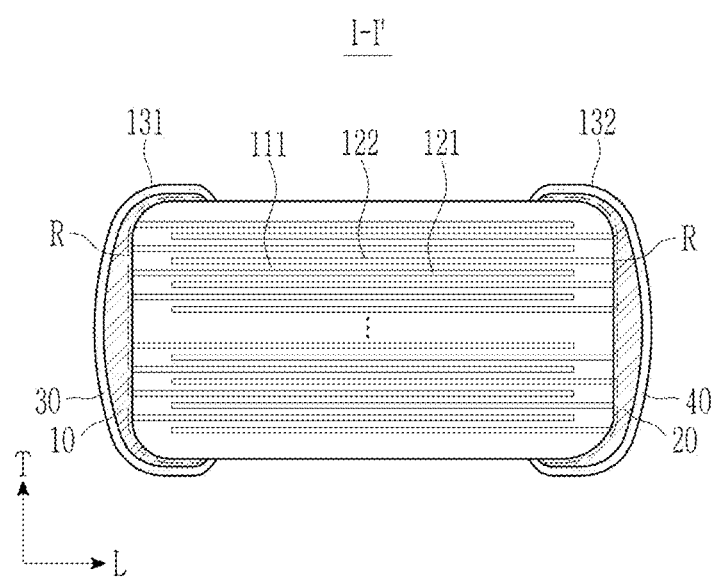
FIG. 2 is a cross-sectional view of a multilayer ceramic capacitor taken along line I-I' in FIG. 1.
Figure 3:
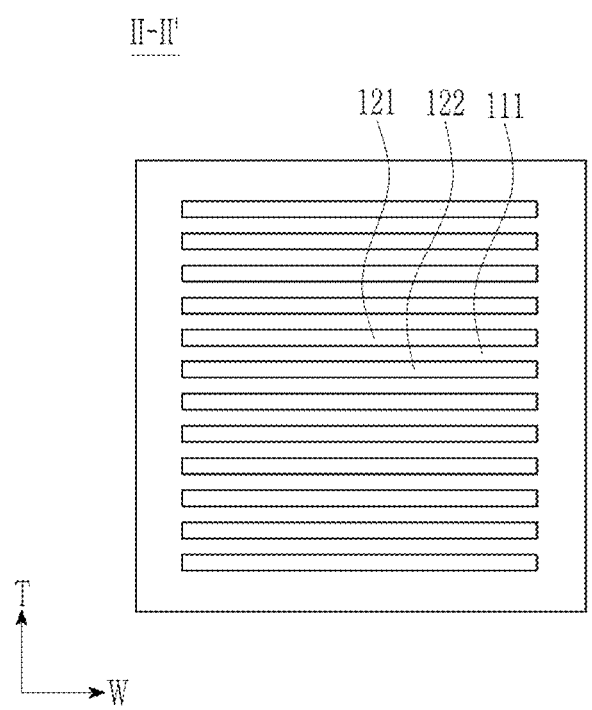
FIG. 3 is a cross-sectional view of the multilayer ceramic capacitor taken along line II-II in FIG. 1.

FIG. 1 is a perspective view showing a multilayer ceramic capacitor according to an embodiment, FIG. 2 is a cross-sectional view of a multilayer ceramic capacitor taken along line I-I' of FIG. 1, and FIG. 3 is a cross-sectional view of the multilayer ceramic capacitor taken along line II-II in FIG. 1.

The L-axis, W-axis, and T-axis shown in FIGS. 1 to 3 represent the length direction, width direction, and thickness direction of the capacitor body 110, respectively. Here, the thickness direction (T-axis direction) may be a direction perpendicular to the wide surface (main surface) of the sheet-shaped components, and may be used as the same concept as a stacking direction in which a dielectric layer 111 is stacked, for example. The length direction (L-axis direction) may be a direction extending parallel to the wide surface (main surface) of the sheet-shaped components, and may be approximately perpendicular to the thickness direction (T-axis direction). For example, the length direction (L-axis direction) may be the direction in which an external electrode 131 and a second external electrode 132 are located. The width direction (W-axis direction) may be a direction extending parallel to the wide surface (main surface) of the sheet-shaped components, and may be approximately perpendicular to the thickness direction (T-axis direction) and the length direction (L-axis direction). The length of the sheet-shaped components in the length direction (L-axis direction) may be longer than the length in the width direction (W-axis direction).

Referring to FIGS. 1 to 3, the multilayer ceramic capacitor 100 according to an embodiment includes the capacitor body 110 and external electrodes 131 and 132 disposed outside the capacitor body 110. The external electrodes 131 and 132 may include a first external electrode 131 and a second external electrode 132 disposed at opposite ends of the capacitor body 110 in the length direction (L-axis direction).

Capacitor Body

For example, the capacitor body 110 may have a roughly hexahedral shape.

For convenience of description of an embodiment, the two surfaces opposing each other in the thickness direction (T-axis direction) of the capacitor body 110 are referred to as first and second surfaces, the two surfaces connected to the first and second surfaces and opposing each other in the length direction (L-axis direction) are referred to as third and fourth surfaces, and two surfaces connected to the first and second surfaces and to the third and fourth surfaces, and opposing each other in the width direction (W-axis direction) are referred to as fifth and sixth surfaces.

For example, the first surface, which is the lower surface, may be a surface facing the mounting direction. Additionally, the first to sixth surfaces may be flat, but the embodiment is not limited thereto. For example, the first to sixth surfaces may be curved surfaces with a convex central portion, and the edges, which are the boundaries of each surface, may be rounded.

The shape and size of the capacitor body 110 and the number of stacks of the dielectric layers 111 are not limited to those shown in the drawings of the embodiment.

The capacitor body 110 includes a plurality of dielectric layers 111 and internal electrode layers 121 and 122. Specifically, the capacitor body 110 includes the plurality of dielectric layers 111, and a first internal electrode 121 and a second internal electrode 122 alternately arranged in the thickness direction (T-axis direction) with the plurality of dielectric layers 111 interposed therebetween. At this time, the boundaries between adjacent dielectric layers 111 of the capacitor body 110 may be integrated to the extent that it is difficult to check without using a scanning electron microscope (SEM).

The capacitor body 110 may include an active region. The active region is a portion that contributes to forming the capacity of the multilayer ceramic capacitor 100. For example, the active region may be a region where the first internal electrode 121 or the second internal electrode 122 stacked along the thickness direction (T-axis direction) overlap.

Additionally, the capacitor body 110 may further include a cover region and a side margin region.

The cover region is a thickness direction margin portion, and may be positioned on the first and second surfaces of the active region in the thickness direction (T-axis direction), respectively. The cover region may be a single dielectric layer 111 or two or more dielectric layers 111 stacked on the upper and lower surfaces of the active portion A, respectively.

The side margin region is a width direction margin portion and may be positioned on the fifth and sixth surfaces of the active region in the width direction (W-axis direction), respectively. The side margin region may be formed by applying a conductive paste layer for an internal electrode only to a part of the dielectric green sheet surface and not applying the conductive paste layer to both sides of the dielectric green sheet surface when applying the conductive paste layer on the surface of the dielectric green sheet surface, and then stacking and firing the dielectric green sheets.

The cover region and the side margin region serve to prevent damage to the first internal electrode 121 and the second internal electrode 122 due to physical or chemical stress.

The dielectric layer 111 includes a barium titanate-based compound as a primary component.

The barium titanate-based compound is a dielectric base material, has a high dielectric constant, and contributes to forming the dielectric constant of the multilayer ceramic capacitor 100.

The barium titanate-based compound may include, for example, $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, or a combination thereof.

The dielectric layer 111 may further include a secondary component. The secondary component may include, for example, manganese (Mn), chromium (Cr), silicon (Si), aluminum (Al), magnesium (Mg), tin (Sn), antimony (Sb), germanium (Ge), gallium (Ga), indium (In), barium (Ba), lanthanum (La), yttrium (Y), actinium (Ac), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), vanadium (V) or a combination thereof.

The average thickness (average length in the T-axis direction) of the dielectric layer 111 may be 2.0 μm to 8.0 μm, for example, 2.4 μm to 7.8 μm. When the average thickness of the dielectric layer 111 is within the above range, the reliability of the multilayer ceramic capacitor is excellent. The average thickness of the dielectric layer 111 may be obtained as an arithmetic average of the thickness of the dielectric layer 111 at 10 points spaced at predetermined intervals from the reference point, which is the center point in the length direction (L-axis direction) or width direction (W-axis direction) of the dielectric layer 111, in the scanning electron microscope (SEM) image of the cross-sectional sample. The intervals of the 10 points may be adjusted depending on the scale of the SEM image, and may be, for example, 1 μm to 100 μm, 1 μm to 50 μm, or 1 μm to 10 μm. At this time, all 10 points must be positioned within the dielectric layer 111, and if all 10 points are not positioned within the dielectric layer 111, the position of the reference point may be changed, or the interval between the 10 points may be adjusted.

The internal electrode layers 121 and 122, that is, the first internal electrode 121 and the second internal electrode 122 are electrodes having different polarities, which are alternately arranged opposite each other along the T-axis direction with the dielectric layer 111 interposed therebetween, and one end of the first internal electrode 121 and the second internal electrode 122 may be exposed through the third and fourth surfaces of the capacitor body 110, respectively.

The first internal electrode 121 and the second internal electrode 122 may be electrically insulated from each other by the dielectric layer 111 disposed in the middle.

The ends of the first internal electrode 121 and the second internal electrode 122, which are alternately exposed through the third and fourth surfaces of the capacitor body 110, may be connected and electrically connected with the first external electrode 131 and the second external electrode 132, respectively.

The first internal electrode 121 and the second internal electrode 122 may include a conductive metal, for example, a metal such as Ni, Cu, Ag, Pd, Au, or an alloy thereof, such as an Ag—Pd alloy.

Additionally, the first internal electrode 121 and the second internal electrode 122 may include dielectric particles of the same composition as the ceramic material included in the dielectric layer 111.

The first internal electrode 121 and the second internal electrode 122 may be formed using a conductive paste including a conductive metal. The printing method of the conductive paste may be a screen-printing method or a gravure printing method.

The average thickness of the first internal electrode 121 and the second internal electrode 122 may be 0.1 μm to 2 μm. The average thickness of the first internal electrode 121 and the second internal electrode 122 may be measured by the SEM analysis. Here, since the SEM analysis is the same as the method for measuring the average thickness of the dielectric layer 111 described above, a description thereof will be omitted.

The capacitor body 110 may be formed by firing a stacking structure in which the plurality of dielectric layers 111 and internal electrode layers 121 and 122 are stacked.

External Electrode

Referring to FIG. 2, the first external electrode 131 and the second external electrode 132 are provided with voltages of different polarities and may be electrically connected with exposed portions of the first internal electrode 121 and the second internal electrode 122, respectively.

According to the above configuration, when a predetermined voltage is applied to the first external electrode 131 and the second external electrode 132, charges are accumulated between the opposing first internal electrode 121 and the second internal electrode 122. At this time, the capacitance of the multilayer ceramic capacitor 100 is proportional to the overlapped area of the first internal electrode 121 and the second internal electrode 122, which are overlap each other along the T-axis direction in the active region.

The first external electrode 131 and the second external electrode 132 may each include first and second connection portions respectively disposed on the third and fourth surfaces of the capacitor body 110 to connect with the first internal electrode 121 and the second internal electrode 122, and first and second band portions disposed at the corners where the third and fourth surfaces or the fifth and sixth surfaces of the capacitor body 110 meet.

The first and second band portions may extend from the first and second connection portions to parts of the first and second surfaces or the fifth and sixth surfaces of the capacitor body 110, respectively. The first and second band portions may serve to improve the adhesion strength of the first external electrode 131 and the second external electrode 132.

The external electrodes 131 and 132 include electrode layers 10 and 20 disposed on the cross-section of the capacitor body 110 to be electrically connected to at least one of the internal electrode layers 121 and 122. Specifically, the first external electrode 131 includes a first electrode layer 10 disposed directly on the cross-section of the capacitor body 110 to be electrically connected to the first internal electrode 121. Additionally, the second external electrode 132 includes a second electrode layer 20 disposed directly on the cross-section of the capacitor body 110 to be electrically connected to the second internal electrode 122.

The electrode layers 10 and 20 may include conductive metal and glass.

The conductive metal may include copper (Cu), nickel (Ni), silver (Ag), palladium (Pd), gold (Au), platinum (Pt), tin (Sn), tungsten (W), titanium (Ti), lead (Pb), and an alloy thereof, or a combination thereof. Among these, the conductive metal may include, for example, copper (Cu) or a copper (Cu) alloy.

The conductive metal may be in powder form. Additionally, the conductive metal may have a spherical or flake shape. The size (D50) of the spherical conductive metal may be 0.1 μm to 5 μm, for example, 0.5 μm to 3 μm. The size of the conductive metal in flake shape may be 1 μm to 20 μm, for example, 5 μm to 15 μm based on the major axis. The size (D50) of the conductive metal may be calculated by measuring the maximum major axis of at least 100 conductive metal particles in the scanning electron microscope (SEM) image of a cross-sectional sample and creating a size distribution accumulation curve. D50 refers to the size at 50% of the size distribution accumulation curve.

The glass may include cobalt (Co).

In the manufacturing process of the capacitor body 110, specifically, in a process of firing a dielectric green sheet laminate in which dielectric layers 111 made of a barium titanate-based compound and internal electrode layers 121 and 122 made of nickel (Ni) are alternately laminated, firing is performed under relatively mild reducing conditions to prevent deterioration of the properties of the dielectric green sheet laminate. In the capacitor body 110 formed after completion of firing, the ends of the internal electrode layers 121 and 122 made of nickel (Ni) are oxidized to nickel oxide (NiO). According to an embodiment, when a cobalt (Co) component is included in the electrode layers 10 and 20 of the external electrodes 131 and 132, during the heat treatment of the sintering process when manufacturing the external electrode, the reduction behavior of nickel oxide (NiO) at the interface where the external electrodes 131 and 132 and the internal electrode layers 121 and 122 contact may be promoted, that is, the reaction to reduce nickel oxide (NiO) may be promoted. Accordingly, a Cu—Ni alloy may be formed and the connectivity between the external electrode and the internal electrode layer may be improved. In addition, the formation of the Cu—Ni alloy improves the connectivity between the external electrode and the internal electrode layer, thereby improving the capacity distribution characteristics and lowering the equivalent series resistance (ESR) value. Accordingly, the moisture resistance reliability of the multilayer ceramic capacitor, may be improved.

Cobalt (Co) may be included in an amount of 0.13 parts by weight to 0.64 parts by weight, for example, 0.133 parts by weight to 0.636 parts by weight, based on 100 parts by weight of the conductive metal. When cobalt (Co) as a glass component is included within the above content range in the electrode layers 10 and 20, the reduction behavior of nickel oxide (NiO) may be promoted during the heat treatment of the firing process at the interface where the external electrodes 131 and 132 and the internal electrode layers 121 and 122 contact, which may enhance the formation of Cu—Ni alloy. Accordingly, the connectivity between the external electrode and the internal electrode layer is improved, thereby securing a multilayer ceramic capacitor with excellent moisture resistance reliability.

For example, cobalt (Co) may be present in a region close to the interface between the electrode layers 10 and 20 and the internal electrode layers 121 and 122 within the electrode layers 10 and 20, that is, in an interface near region (R). Specifically, the interface near region (R) may be defined as the region from the interface between the electrode layers 10 and 20 of the external electrodes 131 and 132 and the internal electrode layers 121 and 122 to a point that is 5% to 15% of the total thickness of the external electrode in the length direction (L axis).

When cobalt (Co) is mainly included in the interface near region (R), the reduction reaction of nickel oxide (NiO) formed on the surface where the external electrodes 131 and 132 and the internal electrode layers 121 and 122 contact is promoted, thereby facilitating Cu—Ni alloy formation. Accordingly, the connectivity between the external electrode and the internal electrode layer may be improved.

The glass may further include iron (Fe). If glass includes both cobalt (Co) and iron (Fe), the reduction reaction of nickel oxide (NiO) may be promoted during firing. Accordingly, the formation of Cu—Ni alloy may be facilitated and the connectivity between the external electrode and the internal electrode layer may be improved.

Iron (Fe) may be included in an amount of 0.18 parts by weight to 0.91 parts by weight, for example, 0.189 parts by weight to 0.905 parts by weight, based on 100 parts by weight of the conductive metal. When iron (Fe) as a glass component is included within the above content range in the electrode layers 10 and 20, it is easy to form a Cu—Ni alloy after sintering in the external electrode formation process, and thus the connectivity between the external electrode and the internal electrode layer may be improved.

For example, iron (Fe) may be present in a region close to the interface between the electrode layers 10 and 20 and the internal electrode layers 121 and 122 within the electrode layers 10 and 20, that is, in the interface near region (R) defined above. When iron (Fe) is mainly included in the interface near region (R), the reduction reaction of nickel oxide (NiO) is promoted, thereby facilitating the formation of Cu—Ni alloy. Accordingly, the connectivity between the external electrode and the internal electrode layer may be improved.

In addition to cobalt (Co) and iron (Fe), glass may further include lithium (Li), potassium (K), silicon (Si), aluminum (Al), nickel (Ni), silver (Ag), sodium (Na), and barium (Ba), calcium (Ca), strontium (Sr), boron (B), zinc (Zn), tin (Sn), copper (Cu), indium (In), titanium (Ti), phosphorus (P), manganese (Mn), germanium (Ge), or a combination thereof.

Lithium (Li) may be included in an amount of 5 wt % to 20 wt %, for example, 7 wt % to 17 wt %, based on the total amount of glass. Potassium (K) may be included in an amount of 5 wt % to 20 wt %, for example, 7 wt % to 17 wt %, based on the total amount of glass. Silicon (Si) may be included in an amount of 5 wt % to 20 wt %, for example, 7 wt % to 17 wt %, based on the total amount of glass. Aluminum (Al) may be included in an amount of 5 wt % to 15 wt %, for example, 7 wt % to 13 wt %, based on the total amount of glass. Nickel (Ni) may be included in an amount of 0.01 wt % to 20 wt %, for example, 0.1 wt % to 15 wt %, based on the total amount of glass. Silver (Ag) may be included in an amount of 0.01 wt % to 15 wt %, for example, 0.1 wt % to 10 wt %, based on the total amount of glass. Sodium (Na) may be included in an amount of 0.01 wt % to 25 wt %, for example, 0.1 wt % to 20 wt %, based on the total amount of glass. Barium (Ba) may be included in an amount of 15 wt % to 45 wt %, for example, 20 wt % to 40 wt %, based on the total amount of glass. Calcium (Ca) may be included in an amount of 15 wt % to 45 wt %, for example, 20 wt % to 40 wt %, based on the total amount of glass. Strontium (Sr) may be included in an amount of 15 wt % to 45 wt %, for example, 20 wt % to 40 wt %, based on the total amount of glass. Boron (B) may be included in an amount of 15 wt % to 25 wt %, for example, 17 wt % to 23 wt %, based on the total amount of glass. Zinc (Zn) may be included in an amount of 1 wt % to 15 wt %, for example, 3 wt % to 13 wt %, based on the total amount of glass. Tin (Sn) may be included in an amount of 0.01 wt % to 15 wt %, for example, 0.1 wt % to 10 wt %, based on the total amount of glass. Copper (Cu) may be included in an amount of 0.01 wt % to 15 wt %, for example, 0.1 wt % to 10 wt %, based on the total amount of glass. Indium (In) may be included in an amount of 0.01 wt % to 15 wt %, for example, 0.1 wt % to 10 wt %, based on the total amount of glass. Titanium (Ti) may be included in an amount of 0.01 wt % to 15 wt %, for example, 0.1 wt % to 10 wt %, based on the total amount of glass. Phosphorus (P) may be included in an amount of 0.01 wt % to 15 wt %, for example, 0.1 wt % to 10 wt %, based on the total amount of glass. Manganese (Mn) may be included in an amount of 0.01 wt % to 15 wt %, for example, 0.1 wt % to 10 wt %, based on the total amount of glass. Germanium (Ge) may be included in an amount of 0.01 wt % to 15 wt %, for example, 0.1 wt % to 10 wt %, based on the total amount of glass. When the above components as glass components are included within the above content range, the formation of Cu—Ni alloy after sintering during the external electrode formation process may be facilitated, thereby improving the connectivity between the external electrode and the internal electrode layer.

The above-mentioned glass components included in the electrode layers 10 and 20 may be confirmed through scanning electron microscope (SEM) analysis and electron probe microanalyzer (EPMA) mapping. Other methods and/or tools appreciated by one of ordinary skill in the art, even if not described in the present disclosure, may also be used.

SEM analysis may be measured in the following method. After laying down the multilayer ceramic capacitor 100 horizontally, the surrounding area of the multilayer ceramic capacitor 100 is fixed with epoxy resin and polished with a polisher so that a cross-sectional sample with an LT surface may be obtained, which allows the observation of the capacitor body 110 and the external electrodes 131 and 132. The obtained cross-sectional sample may then be measured using a scanning electron microscope (SEM). For example, The SEM may be measured under conditions of 5 keV and 300 pA using a TESCAN SOLARIS X, within about 55 µm×50 µm region, such that the internal electrode layers 121 and 122 and external electrodes 131 and 132 of the capacitor body 110 are visible.

Additionally, electron probe microanalyzer (EPMA) mapping may be analyzed in the following method. First, a cross-sectional sample may be obtained from the multilayer ceramic capacitor 100 by the method described above. By measuring electron probe microanalyzer (EPMA) analysis on the obtained cross-sectional sample, the mapping of each element present in the electrode layer of the external electrode and the content of each element may be confirmed.

Through EPMA analysis, it can be seen that cobalt (Co) and iron (Fe) components are observed within the glass matrix. From this, it can be seen that cobalt (Co) and iron (Fe) exist as glass components in the electrode layers 10 and 20.

The glass may be included in an amount of 1 parts by weight to 40 parts by weight, for example, 5 parts by weight to 35 parts by weight, based on 100 parts by weight of the conductive metal. When the glass component is included within the above content range, a Cu—Ni alloy is formed after sintering, so that the connectivity between the external electrode and the internal electrode layer may be improved.

The glass may be in powder form. The size of the glass, specifically the average particle diameter D50, may be 0.1 µm to 5 µm, for example, 0.5 µm to 3 µm. If the size of the glass is within the above range, a Cu—Ni alloy is formed after sintering, so that the connectivity between the external electrode and the internal electrode layer may be improved. The average particle diameter (D50) of glass may be calculated by measuring the maximum major axis of at least 100 conductive metal particles in the scanning electron microscope (SEM) image of a cross-sectional sample and creating a size distribution accumulation curve. Other methods and/or tools appreciated by one of ordinary skill in the art, even if not described in the present disclosure, may also be used. D50 refers to the size at 50% of the size distribution accumulation curve.

The above-mentioned electrode layers 10 and 20 may be sintered metal layers of external electrodes.

The external electrodes 131 and 132 may further include a conductive resin layer (not shown) disposed on the electrode layers 10 and 20, and plating layers 30 and 40 disposed to cover the conductive resin layer.

The conductive resin layer extends to the first and second surfaces or the fifth and sixth surfaces of the capacitor body 110, and the length of the region (i.e., band portion) where the conductive resin layer is extended and disposed to the first and second surfaces or the fifth and sixth surfaces of the capacitor body 110 may be longer than the length of the region (i.e., band portion) where electrode layers 10 and 20 are extended and disposed to the first and second surfaces or the fifth and sixth surfaces of the capacitor body 110. That is, the conductive resin layer is formed on the electrode layers 10 and 20, and may be formed to completely cover the electrode layers 10 and 20.

The conductive resin layer includes resin and conductive metal.

The resin included in the conductive resin layer may be implemented by a material which has adhesive properties and shock absorption properties and is able to form a paste when mixed with the conductive metal powder, but is not limited thereto. For example, the resin may include phenolic resin, acrylic resin, silicone resin, epoxy resin, or polyimide resin.

The conductive metal included in the conductive resin layer serves to electrically connect the internal electrode layers 121 and 122 or the electrode layers 10 and 20.

The conductive metal included in the conductive resin layer may have a spherical shape, a flake shape, or a combination thereof. That is, the conductive metal may be formed only in flake form, only in spherical form, or in a mixed form of flake form and spherical form.

Here, the spherical shape may also include a shape that is not a perfect spherical shape, for example, a shape in which the length ratio of the major axis and the minor axis (major axis/minor axis) is 1.45 or less. Flake shape powder refers to a powder with a flat and elongated shape, and is not particularly limited. But for example, the length ratio of the major axis and the minor axis (major axis/minor axis) may be 1.95 or more.

The external electrodes 131 and 132 may further include a conductive resin layer (not shown) disposed on the electrode layers 10 and 20, and plating layers 30 and 40 disposed to cover the conductive resin layer.

The plating layers 30 and 40 may specifically include a first plating layer disposed on the first electrode layer 10 and a second plating layer 40 disposed on the second electrode layer 20.

The plating layers 30 and 40 may include nickel (Ni), copper (Cu), tin (Sn), palladium (Pd), platinum (Pt), gold (Au), silver (Ag), tungsten (W), titanium (Ti), or lead (Pb), either alone or in an alloy thereof. For example, the plating layer may be a nickel (Ni) plating layer or a tin (Sn) plating layer, may be a form in which the nickel (Ni) plating layer and the tin (Sn) plating layer are sequentially stacked, or may be a form in which the tin (Sn) plating layer, the nickel (Ni) plating layer, and the tin (Sn) plating layer are sequentially stacked. Additionally, the plating layer may include a plurality of nickel (Ni) plating layers and/or a plurality of tin (Sn) plating layers.

The plating layer may improve mountability to the substrate, structural reliability, durability to the outside, heat resistance, and equivalent series resistance (ESR) of the multilayer ceramic capacitor 100.

Hereinafter, a method of manufacturing the multilayer ceramic capacitor 100 according to an embodiment will be described.

The multilayer ceramic capacitor 100 according to an embodiment may be manufactured through applying a paste for forming an electrode layer including a conductive metal and glass composition to one surface of the capacitor body 110 including the dielectric layer 111 and the internal electrode layers 121 and 122, and sintering the paste for forming the electrode layer to form the electrode layers 10 and 20 of the external electrodes 131 and 132.

First, the method of manufacturing the capacitor body 110 will be described.

The capacitor body 110 may be manufactured through preparing a dielectric green sheet using a dielectric slurry and forming a conductive paste layer on the surface of the dielectric green sheet, preparing a dielectric green sheet laminate by stacking the dielectric green sheets on which the conductive paste layer is formed, and firing the dielectric green sheet laminate.

The dielectric slurry may be prepared by mixing a barium titanate-based compound as a primary component powder and, selectively, a secondary component powder.

The barium titanate-based compound is the same as described above.

The secondary component powder may include, for example, manganese (Mn), chromium (Cr), silicon (Si), aluminum (Al), magnesium (Mg), tin (Sn), antimony (Sb), germanium (Ge), gallium (Ga), Indium (In), barium (Ba), lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), vanadium (V), or a combination thereof, but it is not limited thereto. Each of the secondary component powders may be included in an amount of 0.01 parts by mole to 5 parts by mole based on 100 parts by mole of the primary component powder of the barium titanate-based compound.

The secondary component powder may be used in the form of an oxide or salt compound including each metal, or may be used in the form of a sol dispersed in an organic solvent.

Additionally, dielectric slurry may be prepared by additionally mixing solvents and additives such as dispersants, binders, plasticizers, lubricants, and antistatic agents.

Mixing of the primary component powder of the barium titanate-based compound and optionally the secondary component powder may be used a wet ball mill or agitated mill. When using zirconia balls in a wet ball mill, a plurality of zirconia balls with a diameter of 0.1 mm to 10 mm may be used for wet mixing for 8 hours to 48 hours, or 10 hours to 24 hours.

The prepared dielectric slurry is formed into a dielectric layer after firing.

As a method of molding the prepared dielectric slurry into a sheet shape, a tape molding method such as a doctor blade method, a calender roll method, etc. may be used, for example, an on-roll molding coater with a head discharge method, and a dielectric green sheet may be obtained by drying the molded body afterward.

To form a conductive paste layer that becomes an internal electrode layer after firing, a conductive paste may be prepared by mixing a conductive powder made of a conductive metal or an alloy thereof, a binder, and a solvent.

Additionally, barium titanate powder may be mixed together as a co-material if necessary. The co-material may act to suppress sintering of the conductive powder during the firing process. A conductive paste layer is formed by applying a conductive paste to the surface of the dielectric green sheet in a predetermined pattern using various printing methods such as screen-printing or transfer methods.

The conductive powder may include nickel (Ni) or a nickel (Ni) alloy.

Next, a dielectric green sheet stacking structure is prepared by stacking a plurality of layers of dielectric green sheets on which internal electrode patterns are formed, and then pressing the plurality of layers of dielectric green sheets in the stacking direction. At this time, the dielectric green sheet and the internal electrode pattern may be stacked so that the dielectric green sheet is positioned on the upper and lower surfaces of the dielectric green sheet stacking structure in the stacking direction.

The step of cutting the prepared dielectric green sheet stacking structure to a predetermined size by dicing or the like may optionally be performed.

Additionally, the dielectric green sheet laminate may be solidified and dried to remove plasticizers, etc., if necessary, and after solidified and dried, the dielectric green sheet laminate may be barrel polished using a horizontal centrifugal barrel machine, and the like. In barrel polishing, the dielectric green sheet laminate is placed into a barrel container with media and polishing liquid, and rotational motion or vibration is applied to the barrel container, thus unnecessary parts, such as burrs generated during cutting, may be polished. Additionally, after barrel polishing, the dielectric green sheet laminate may be washed with a cleaning solution such as water, and dried.

Subsequently, the capacitor body may be manufactured after binder removal treatment and firing of the dielectric green sheet laminate.

The conditions for binder removal may be appropriately adjusted depending on the components of the dielectric layer or the internal electrode layer. For example, the rate of temperature rise during binder removal treatment may be 5° C./hour to 300° C./hour, the support temperature may be 180° C. to 400° C., and the temperature holding time may be 0.5 hour to 24 hours. The atmosphere during binder removal treatment may be air or a reducing atmosphere.

The conditions of the firing treatment may be appropriately adjusted depending on the primary component composition of the dielectric layer or the primary component composition of the internal electrode. For example, firing may be performed at a temperature of 1100° C. to 1400° C., for example, 1200° C. to 1350° C. Further, firing may also be performed for 0.5 hours to 8 hours, for example, 1 hour to 3 hours. Additionally, sintering may be performed in a reducing atmosphere, for example, in a humidified mixed gas of nitrogen and hydrogen. When the internal electrode includes nickel (Ni) or a nickel (Ni) alloy, the oxygen partial pressure in the firing atmosphere may be $1.0 \times 10^{-14}$ MPa to $1.0 \times 10^{-10}$ MPa.

After firing treatment, annealing may be performed as needed. Annealing is a treatment to reoxidize the dielectric layer, and annealing may be performed if firing is performed in a reducing atmosphere. The conditions of the annealing treatment may also be appropriately adjusted depending on the components of the dielectric layer. For example, the annealing temperature may be 950° C. to 1150° C., the time may be 0 to 20 hours, and the rate of temperature rise may be 50° C./hour to 500° C./hour. The annealing atmosphere may be a humidified nitrogen gas ($N_2$) atmosphere, and the oxygen partial pressure may be $1.0 \times 10^{-9}$ MPa to $1.0 \times 10^{-5}$ MPa.

In binder removal treatment, firing treatment, or annealing treatment, for example, a wetter may be used to humidify nitrogen gas or mixed gas. In this case, the water temperature may be 5° C. to 75° C. The binder removal treatment, firing treatment, and annealing treatment may be performed sequentially or independently.

Optionally, surface treatment such as sand blasting, laser irradiation, barrel polishing, etc. may be performed on the third and fourth surfaces of the manufactured capacitor body 110. By performing this surface treatment, the ends of the first internal electrode and the second internal electrode may be exposed to the outermost surfaces of the third and fourth surfaces, and thus the electrical connection between the first external electrode and the second external electrode, and the first internal electrode and the second internal electrode may be improved, alloy portions may be easily formed.

Hereinafter, the method of manufacturing the external electrodes 131 and 132 will be described.

The external electrodes 131 and 132 may be manufactured by applying a paste for forming an electrode layer to one surface of the manufactured capacitor body 110 and sintering to form the electrode layers 10 and 20.

The paste for forming the electrode layer may include a conductive metal and glass composition.

The conductive metal may include copper (Cu), nickel (Ni), silver (Ag), palladium (Pd), gold (Au), platinum (Pt), tin (Sn), tungsten (W), titanium (Ti), lead (Pb), and an alloy thereof, or a combination thereof. Among these, the conductive metal may include, for example, copper (Cu) or a copper (Cu) alloy.

The glass composition may include cobalt oxide (CoO).

Cobalt oxide (CoO) may be included in an amount of 0.13 parts by weight to 0.64 parts by weight, for example, 0.133 parts by weight to 0.636 parts by weight, based on 100 parts by weight of the conductive metal.

The glass composition may further include iron oxide. The iron oxide may include FeO, $Fe_2O_3$, $Fe_3O_4$, or a combination thereof.

Iron oxide may be included in an amount of 0.18 parts by weight to 0.91 parts by weight, for example, 0.189 parts by weight to 0.905 parts by weight, based on 100 parts by weight of the conductive metal.

In addition to cobalt oxide (CoO) and iron oxide, the glass composition may further include lithium oxide ($Li_2O$), potassium oxide ($K_2O$), silicon dioxide ($SiO_2$), aluminum oxide ($Al_2O_3$), nickel oxide (NiO), silver oxide ($Ag_2O$), sodium oxide (NaO), barium oxide (BaO), calcium oxide (CaO), strontium oxide (SrO), boron oxide ($B_2O_3$), zinc oxide (ZnO), tin oxide including SnO, $SnO_2$, or a combination thereof, copper oxide including $Cu_2O$, CuO, or a combination thereof, indium oxide ($In_2O_3$), titanium dioxide ($TiO_2$), phosphorus pentoxide ($P_2O_5$), manganese oxide including MnO, $Mn_2O$, $Mn_2O_3$, $Mn_3O_4$, or a combination thereof, germanium oxide ($GeO_2$) or a combination thereof.

Lithium oxide ($Li_2O$) may be included in an amount of 5 wt % to 20 wt %, for example, 7 wt % to 17 wt %, based on the total amount of the glass composition. Potassium oxide ($K_2O$) may be included in an amount of 5 wt % to 20 wt %, for example, 7 wt % to 17 wt %, based on the total amount of the glass composition. Silicon dioxide ($SiO_2$) may be included in an amount of 5 wt % to 20 wt %, for example, 7 wt % to 17 wt %, based on the total amount of the glass composition. Aluminum oxide ($Al_2O_3$) may be included in an amount of 5 wt % to 15 wt %, for example, 7 wt % to 13 wt %, based on the total amount of the glass composition. Nickel oxide (NiO) may be included in an amount of 0.01 wt % to 20 wt %, for example, 0.1 wt % to 15 wt %, based on the total amount of the glass composition. Silver oxide ($Ag_2O$) may be included in an amount of 0.01 wt % to 15 wt %, for example, 0.1 wt % to 10 wt %, based on the total amount of the glass composition. Sodium oxide (NaO) may be included in an amount of 0.01% by weight to 25% by weight, for example, 0.1% by weight to 20% by weight, based on the total amount of the glass composition. Barium oxide (BaO) may be included in an amount of 15 wt % to 45 wt %, for example, 20 wt % to 40 wt %, based on the total amount of the glass composition. Calcium oxide (CaO) may be included in an amount of 15 wt % to 45 wt %, for example, 20 wt % to 40 wt %, based on the total amount of the glass composition. Strontium oxide (SrO) may be included in an amount of 15 wt % to 45 wt %, for example, 20 wt % to 40 wt %, based on the total amount of the glass composition. Boron oxide ($B_2O_3$) may be included in an amount of 15 wt % to 25 wt %, for example, 17 wt % to 23 wt %, based on the total amount of the glass composition. Zinc oxide (ZnO) may be included in an amount of 1 wt % to 15 wt %, for example, 3 wt % to 13 wt %, based on the total amount of the glass composition. Tin oxide may be included in an amount of 0.01 wt % to 15 wt %, for example, 0.1 wt % to 10 wt %, based on the total amount of the glass composition. Copper oxide may be included in an amount of 0.01% by weight to 15% by weight, for example, 0.1% by weight to 10% by weight, based on the total amount of the glass composition. Indium oxide ($In_2O_3$) may be included in an amount of 0.01 wt % to 15 wt %, for example, 0.1 wt % to 10 wt %, based on the total amount of the glass composition. Titanium dioxide ($TiO_2$) may be included in an amount of 0.01 wt % to 15 wt %, for example, 0.1 wt % to 10 wt %, based on the total amount of the glass composition. Phosphorus pentoxide ($P_2O_5$) may be included in an amount of 0.01 wt % to 15 wt %, for example, 0.1 wt % to 10 wt %, based on the total amount of the glass composition. Manganese oxide may be included in an amount of 0.01 wt % to 15 wt %, for example, 0.1 wt % to 10 wt %, based on the total amount of the glass composition. Germanium oxide ($GeO_2$) may be included in an amount of 0.01 wt % to 15 wt %, for example, 0.1 wt % to 10 wt %, based on the total amount of the glass composition.

The glass may be prepared by mixing the components of the glass composition, heat-treating at a certain temperature or higher, quenching, and then atomizing, or using gas, liquid, spray pyrolysis methods.

The glass composition may be included in an amount of 1 parts by weight to 40 parts by weight, for example, 5 parts by weight to 35 parts by weight, based on 100 parts by weight of the conductive metal.

The paste for forming the electrode layer may further include a binder, solvent, dispersant, plasticizer, oxide powder, or the like.

The binder may be, for example, ethylcellulose, acrylic, butyral, etc., and the solvent may be, for example, an organic solvent or aqueous solvent such as terpineol, butylcarbitol, alcohol, methyl ethyl ketone, acetone, toluene, and the like.

Methods for applying the paste for forming the electrode layer on the outer surface of the capacitor body 110 may include various printing methods such as dip method and screen-printing, application method using a dispenser, etc., and spraying method using spray. The paste for forming the electrode layer may be applied to at least the third and fourth surfaces of the capacitor body 110, and optionally applied to a part of the first, second, fifth, or sixth surfaces on which the band portions of the first and second external electrodes are formed.

Sintering may be performed at a temperature of 400° C. to 850° C. When sintering is performed within the above temperature range, nickel oxide (NiO) may be easily reduced to form a Cu—Ni alloy. The formation of the Cu—Ni alloy not only improves the connectivity between the external electrode and the internal electrode layer, but also improves capacity distribution and lowers equivalent series resistance (ESR).

Next, selectively, the paste for forming the conductive resin layer may be applied to the outer surface of the capacitor body 110 where the electrode layers 10 and 20 are formed and then cured to form a conductive resin layer.

The paste for forming the conductive resin layer may include a resin and, optionally, a conductive metal or a non-conductive filler. Since the description of the conductive metal and resin is the same as described above, repetitive description will be omitted. Additionally, the paste for forming the conductive resin layer may optionally include a binder, solvent, dispersant, plasticizer, oxide powder, and the like. The binder may be, for example, ethylcellulose, acrylic, butyral, etc., and the solvent may be an organic solvent or aqueous solvent such as terpineol, butylcarbitol, alcohol, methyl ethyl ketone, acetone, and toluene.

For example, the method of forming the conductive resin layer may be formed by dipping the capacitor body 110 in a paste for forming the conductive resin layer and then curing it, or by printing the paste for forming the conductive resin layer on the surface of the capacitor body 110 by a screen-printing method or a gravure printing method, or by applying the paste for forming the conductive resin layer to the surface of the capacitor body 110 and then curing it.

Next, plating layers 30 and 40 may be formed on the outside of the conductive resin layer.

For example, the plating layer may be formed by a plating method, sputtering, or electrolytic plating (electric deposition).

The above-described embodiments will be described in more detail through examples below. However, the following examples are for illustrative purposes only and do not limit the scope of appended claims.

(Manufacturing of Multilayer Ceramic Capacitor)

Examples 1 to 13 and Comparative Examples 1 to 13

A dielectric green sheet laminate was prepared by preparing a dielectric green sheet using barium titanate (BaTiO$_3$) as the primary component powder, then printing a conductive paste layer containing nickel (Ni) on the surface of the dielectric green sheet, and stacking and pressing the dielectric green sheet (width×length×height=3.2 mm×2.5 mm×2.5 mm) with the conductive paste layer formed. The dielectric green sheet laminate was sintered under conditions of 400° C. or lower, in a nitrogen atmosphere through a plasticizing process, and at a sintering temperature of 1300° C. or lower, with a hydrogen concentration of 1.0% H$_2$ or less, to manufacture the capacitor body.

The paste for forming the electrode layer including 10 parts by weight of a glass composition and 8 parts by weight of an acryl-based binder based on 100 parts by weight of copper (Cu) was applied to one surface of the capacitor body. Here, the glass composition was composed of cobalt oxide (CoO) and iron oxide (FeO$_x$), and additional components with the composition shown in Table 1 below in the case of Examples 1 to 13 and Comparative Examples 11 to 13, and was composed only of additional components with the composition of Table 1 in the case of Comparative Examples 1 to 10.

Subsequently, as shown in Table 2 below, the electrode layer of the external electrode was formed by sintering at a temperature of 400° C. to 850° C. Next, a multilayer ceramic capacitor was manufactured through processes such as plating.

TABLE 1

| The unit is wt %. | | | | | | | |
|---|---|---|---|---|---|---|---|
| Li$_2$O | SiO$_2$ | Al$_2$O$_3$ | NiO | Ag$_2$O | NaO | BaO | B$_2$O$_3$ |
| 10 | 10 | 10 | 5 | 1 | 5 | 25 | 20 |
| ZnO | SnO$_x$ (SnO, SnO$_2$) | CuO$_x$ (Cu$_2$O, CuO) | In$_2$O$_3$ | TiO$_2$ | P$_2$O$_5$ | MnO$_x$ (MnO, Mn$_2$O, Mn$_2$O$_3$, Mn$_3$O$_4$) | GeO$_2$ |
| 5 | 1 | 2 | 1 | 1 | 1 | 2 | 1 |

TABLE 2

The contents of CoO and FeO$_x$ are represented based on 100 parts by weight of Cu.

| | CoO (parts by weight) | FeO$_x$ (parts by weight) | Additional component of Table 1 | Sintering temperature(° C.) |
|---|---|---|---|---|
| Example 1 | 0.3 | 0.5 | Included | 400 |
| Example 2 | 0.3 | 0.5 | Included | 450 |
| Example 3 | 0.3 | 0.5 | Included | 500 |
| Example 4 | 0.3 | 0.5 | Included | 550 |
| Example 5 | 0.3 | 0.5 | Included | 600 |
| Example 6 | 0.3 | 0.5 | Included | 650 |
| Example 7 | 0.3 | 0.5 | Included | 700 |
| Example 8 | 0.3 | 0.5 | Included | 750 |
| Example 9 | 0.3 | 0.5 | Included | 800 |
| Example 10 | 0.3 | 0.5 | Included | 850 |
| Example 11 | 0.133 | 0.5 | Included | 700 |
| Example 12 | 0.467 | 0.5 | Included | 700 |
| Example 13 | 0.636 | 0.5 | Included | 700 |
| Comparative Example 1 | — | — | Included | 400 |
| Comparative Example 2 | — | — | Included | 450 |
| Comparative Example 3 | — | — | Included | 500 |
| Comparative Example 4 | — | — | Included | 550 |
| Comparative Example 5 | — | — | Included | 600 |
| Comparative Example 6 | — | — | Included | 650 |
| Comparative Example 7 | — | — | Included | 700 |
| Comparative Example 8 | — | — | Included | 750 |
| Comparative Example 9 | — | — | Included | 800 |
| Comparative Example 10 | — | — | Included | 850 |
| Comparative Example 11 | 0.067 | 0.5 | Included | 700 |
| Comparative Example 12 | 0.703 | 0.5 | Included | 700 |

TABLE 2-continued

The contents of CoO and FeO$_x$ are represented based on 100 parts by weight of Cu.

| | CoO (parts by weight) | FeO$_x$ (parts by weight) | Additional component of Table 1 | Sintering temperature(° C.) |
|---|---|---|---|---|
| Comparative Example 13 | 0.803 | 0.5 | Included | 700 |

Evaluation 1: EPMA analysis

Electron probe microanalyzer (EPMA) analysis was performed on the multilayer ceramic capacitors manufactured in Examples 1 to 13 and Comparative Examples 1 to 13, and the results are shown in Tables 3 and 4 below.

EPMA analysis was performed as follows. After laying down each of the multilayer ceramic capacitors manufactured in Examples 1 to 13 and Comparative Examples 1 to 13 horizontally, the surrounding area of the multilayer ceramic capacitor was fixed with epoxy resin and polished with a polisher, so that a cross-sectional sample with an LT surface was obtained, which allows the observation of the capacitor body and the external electrode. Electron probe microanalysis (EPMA) analysis was performed on the obtained cross-sectional samples. As a result of the measurement, the mapping and content of each element present in the electrode layer of the external electrode were confirmed.

TABLE 3

The contents of Co and Fe are represented based on 100 parts by weight of Cu.

| | Co (parts by weight) | Fe (parts by weight) | Additional component |
|---|---|---|---|
| Examples 1 to 10 | 0.3 | 0.5 | Included |
| Example 11 | 0.133 | 0.5 | Included |
| Example 12 | 0.467 | 0.5 | Included |
| Example 13 | 0.636 | 0.5 | Included |
| Comparative Examples 1 to 10 | — | — | Included |
| Comparative Example 11 | 0.067 | 0.5 | Included |
| Comparative Example 12 | 0.703 | 0.5 | Included |
| Comparative Example 13 | 0.803 | 0.5 | Included |

TABLE 4

The unit is wt %.

| Li | Si | Al | Ni | Ag | Na | Ba | B | Zn | Sn | Cu | In | Ti | P | Mn | Ge |
|---|---|---|---|---|---|---|---|---|---|---|---|---|---|---|---|
| 10 | 10 | 10 | 5 | 1 | 5 | 25 | 20 | 5 | 1 | 2 | 1 | 1 | 1 | 2 | 1 |

Referring to Tables 3 and 4 above, it can be seen that in Examples 1 to 13, cobalt (Co) as a glass component included in the electrode layer of the external electrode is present within an appropriate content range.

Evaluation 2: SEM Analysis

Figure 4:
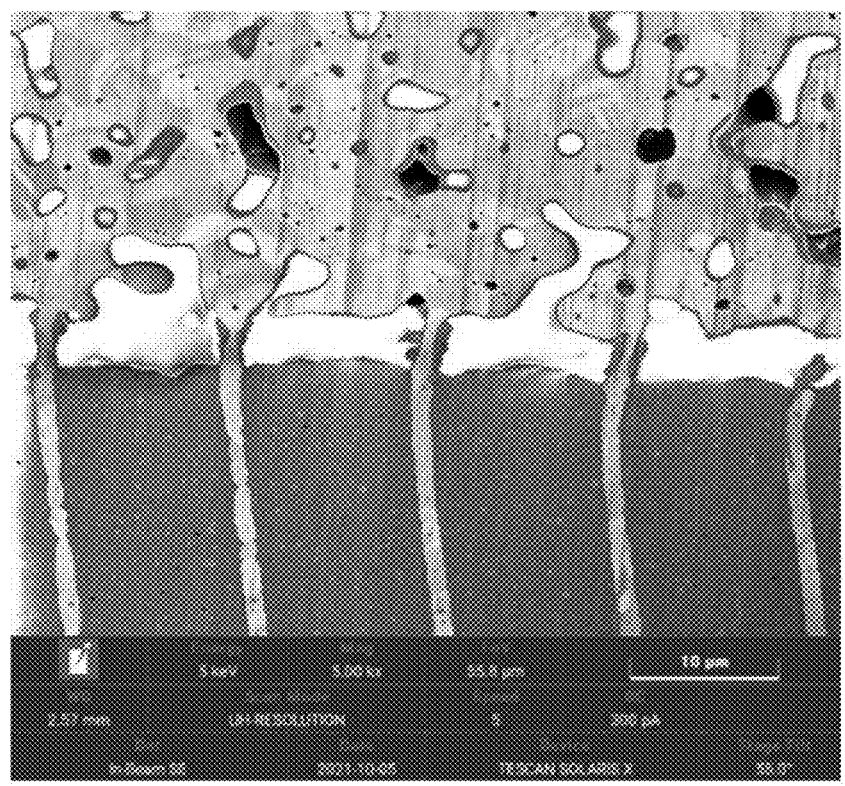
FIG. 4 is an SEM analysis image showing the internal electrode layer and external electrode of the multilayer ceramic capacitor according to Example 1.
Figure 5:
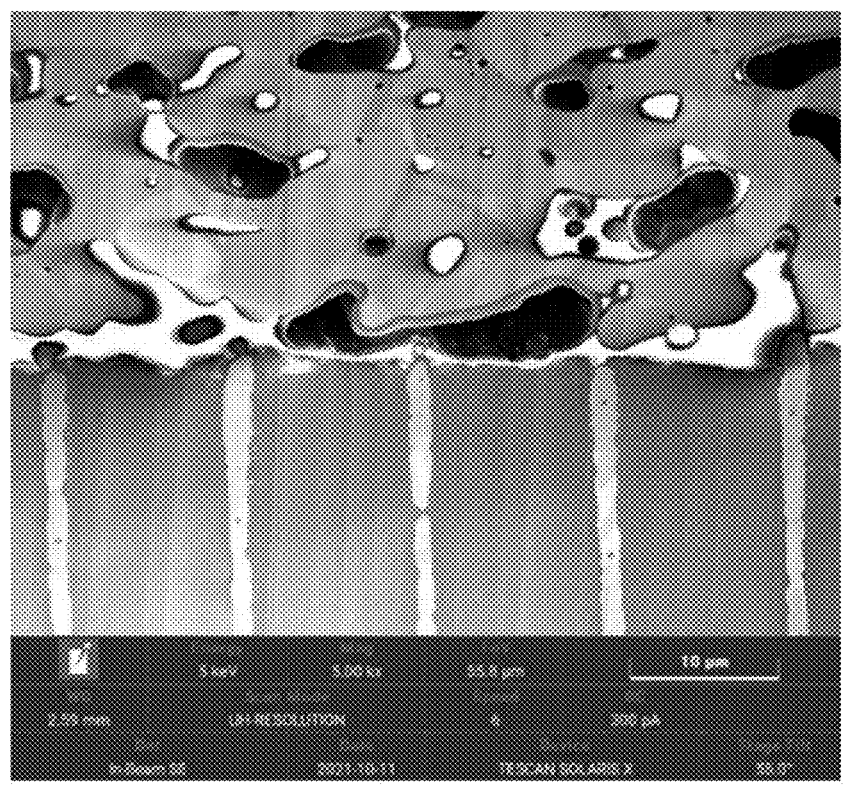
FIG. 5 is an SEM analysis image showing the internal electrode layer and external electrode of the multilayer ceramic capacitor according to Comparative Example 1.

Scanning electron microscope (SEM) analysis was performed on the multilayer ceramic capacitors manufactured in Example 1 and Comparative Example 1, and the results are shown in FIGS. 4 and 5.

SEM analysis was performed as follows. After laying down each of the multilayer ceramic capacitors manufactured in Examples 1 and Comparative Example 1 horizontally, the surrounding area of the multilayer ceramic capacitor was fixed with epoxy resin and polished with a polisher, so that a cross-sectional sample with an LT surface was obtained, which allows the observation of the capacitor body and the external electrode. The obtained cross-sectional sample may then be measured using a scanning electron microscope (SEM). For example, The SEM was measured under conditions of 5 keV and 300 pA using a TESCAN SOLARIS X, within about 55 µm×50 µm region, such that the internal electrode layers and external electrodes of the capacitor body are visible.

FIG. 4 is an SEM analysis image showing the internal electrode layer and external electrode of the multilayer ceramic capacitor according to Example 1, and FIG. 5 is an SEM analysis image showing the internal electrode layer and external electrode of the multilayer ceramic capacitor according to Comparative Example 1.

Referring to FIGS. 4 and 5, it can be seen that in the case of Example 1, which includes cobalt (Co) as a glass component in the electrode layer of the external electrode, it has a structure with excellent connectivity between the internal electrode layer and the external electrode. On the other hand, in Comparative Example 1, which does not include cobalt (Co), it can be seen that it has a structure with deteriorated connectivity between the internal electrode layer and the external electrode.

Evaluation 3: Capacity, ESR and Moisture Resistance Reliability

Capacity, equivalent series resistance (ESR), and a severe evaluation of moisture resistance were measured for the multilayer ceramic capacitors manufactured in Examples 1 to 13 and Comparative Examples 1 to 13, and the results are shown in Table 5 and FIG. 6 below.

Capacity was measured under the conditions of 1 kHz and 0.5V. Based on the measurement results, for 1000 products, those with less than 70% quality were marked as X, those with 70% or higher quality to less than 80% quality were marked as Δ, those with 80% or higher quality to less than 90% quality were marked as ○, and those with 90% or higher quality were marked as ⊚.

Equivalent series resistance (ESR) was measured under 1 MHz conditions. Based on the measurement results, for 1000 products, products with 100 mΩ or less were determined as good quality. Less than 97% good quality was marked as X, between 97% or more to less than 98% good quality was marked as Δ, between 98% or more to less than 99% good quality was marked as ○, and 99% or more good quality was marked as ⊚.

The severe evaluation of moisture resistance was measured at 95° C., relative humidity (R.H.) 95%, and 20 hours using ESPEC (PR-3J, 8585) equipment. During the analysis process, a failure was defined as when the IR (insulation resistance) was 105 or less, and the determination was made based on the time of failure in a quantity of 20k. If the failure time is less than or equal to 48 hours, it was marked as X. If the failure time is more than 48 hours but less than or equal to 216 hours, it was marked as Δ. If the failure time is more than 216 hours but less than or equal to 1024 hours, it was marked as ○. If the failure time is more than 1024 hours, it was marked as ◎.

TABLE 5

Co and Fe are contents represented based on 100 parts by weight of Cu.

| | Co (parts by weight) | Fe (parts by weight) | Sintering temperature(° C.) | Capacity | ESR | Severe evaluation of moisture resistance |
|---|---|---|---|---|---|---|
| Example 1 | 0.3 | 0.5 | 400 | ○ | ○ | ○ |
| Example 2 | 0.3 | 0.5 | 450 | ○ | ○ | ○ |
| Example 3 | 0.3 | 0.5 | 500 | ○ | ○ | ○ |
| Example 4 | 0.3 | 0.5 | 550 | ○ | ◎ | ○ |
| Example 5 | 0.3 | 0.5 | 600 | ◎ | ◎ | ◎ |
| Example 6 | 0.3 | 0.5 | 650 | ◎ | ◎ | ◎ |
| Example 7 | 0.3 | 0.5 | 700 | ◎ | ◎ | ◎ |
| Example 8 | 0.3 | 0.5 | 750 | ◎ | ◎ | ◎ |
| Example 9 | 0.3 | 0.5 | 800 | ◎ | ◎ | ◎ |
| Example 10 | 0.3 | 0.5 | 850 | ○ | ○ | ◎ |
| Example 11 | 0.133 | 0.5 | 700 | ◎ | ◎ | ◎ |
| exemplary embodiment 12 | 0.467 | 0.5 | 700 | ◎ | ◎ | ◎ |
| Example 13 | 0.636 | 0.5 | 700 | ◎ | ◎ | ◎ |
| Comparative Example 1 | — | — | 400 | X | X | X |
| Comparative Example 2 | — | — | 450 | X | X | X |
| Comparative Example 3 | — | — | 500 | X | X | X |
| Comparative Example 4 | — | — | 550 | X | X | X |
| Comparative Example 5 | — | — | 600 | X | X | X |
| Comparative Example 6 | — | — | 650 | X | Δ | X |
| Comparative Example 7 | — | — | 700 | Δ | Δ | Δ |
| Comparative Example 8 | — | — | 750 | Δ | Δ | ○ |
| Comparative Example 9 | — | — | 800 | ○ | Δ | ○ |
| Comparative Example 10 | — | — | 850 | X | X | ○ |
| Comparative Example 11 | 0.067 | 0.5 | 700 | X | X | X |
| Comparative Example 12 | 0.703 | 0.5 | 700 | ○ | Δ | ○ |
| Comparative Example 13 | 0.803 | 0.5 | 700 | X | X | ○ |

Referring to Table 5, it can be seen that in Examples 1 to 13, in which the electrode layer of the external electrode included cobalt (Co) as a glass component within a predetermined content range, the capacity, ESR, and moisture resistance reliability were all excellent. On the contrary, in the case of Comparative Examples 1 to 10 in which cobalt (Co) is not included in the electrode layer of the external electrode and Comparative Examples 11 to 13 in which cobalt (Co) exceeds the predetermined content range, it can be seen that the capacity, ESR and moisture resistance reliability are deteriorated.

Figure 6:
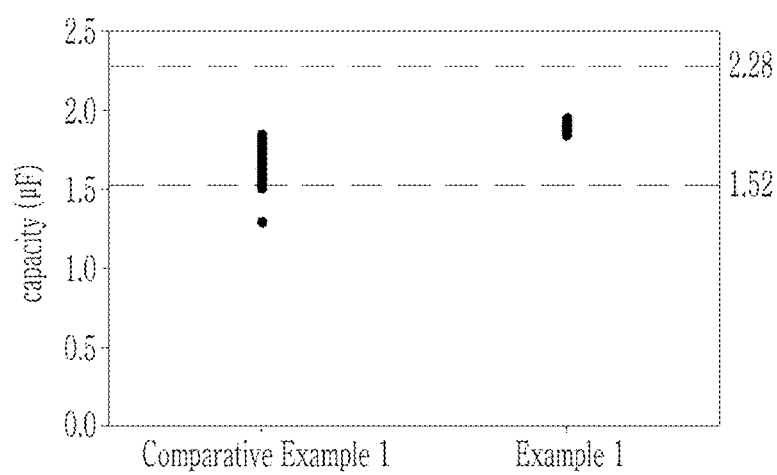
FIG. 6 is a graph showing the capacity of the multilayer ceramic capacitor according to Example 1 and Comparative Example 1.

FIG. 6 is a graph showing the capacity of the multilayer ceramic capacitor according to Example 1 and Comparative Example 1.

Referring to FIG. 6, it can be seen that the capacity distribution characteristics of Example 1, in which cobalt (Co) is included as a glass component in the electrode layer of the external electrode, are improved compared to Comparative Example 1, which does not include cobalt (Co).

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A multilayer ceramic capacitor, comprising:
    a capacitor body including a dielectric layer and an internal electrode layer; and
    an external electrode disposed outside the capacitor body, the external electrode comprising an electrode layer disposed directly on a cross-section of the capacitor body to be electrically connected to at least one of the internal electrode layers,
    the electrode layer comprising a conductive metal; and a glass including cobalt (Co),
    wherein cobalt (Co) is included in an amount of 0.13 parts by weight to 0.64 parts by weight based on 100 parts by weight of the conductive metal.

2. The multilayer ceramic capacitor of claim 1, wherein cobalt (Co) is included in an interface near region, which is defined as a region from an interface between the electrode layer of the external electrode and the internal electrode layer to a point that is 5% to 15% of a total thickness of the external electrode in a length direction (L axis).

3. The multilayer ceramic capacitor of claim 1, wherein the glass further includes iron (Fe).

4. The multilayer ceramic capacitor of claim 3, wherein iron (Fe) is included in an amount of 0.18 parts by weight to 0.91 parts by weight based on 100 parts by weight of the conductive metal.

5. The multilayer ceramic capacitor of claim 3, wherein iron (Fe) is included in an interface near region, which is defined as a region from an interface between the electrode layer of the external electrode and the internal electrode layer to a point that is 5% to 15% of a total thickness of the external electrode in a length direction (L axis).

6. The multilayer ceramic capacitor of claim 1, wherein the glass further includes lithium (Li), potassium (K), silicon (Si), aluminum (Al), nickel (Ni), silver (Ag), sodium (Na), barium (Ba), calcium (Ca), strontium (Sr), boron (B), zinc (Zn), tin (Sn), copper (Cu), indium (In), titanium (Ti), phosphorus (P), manganese (Mn), germanium (Ge) or a combination thereof.

7. The multilayer ceramic capacitor of claim 6, wherein based on a total amount of glass,
lithium (Li) is included in an amount of 5 wt % 20 wt %,
potassium (K), if present, is included in an amount of 5 wt % to 20 wt %,
silicon (Si) is included in an amount of 5 wt % to 20 wt %,
aluminum (Al) is included in an amount of 5 wt % to 15 wt %,
nickel (Ni) is included in an amount of 0.01 wt % to 20 wt %,
silver (Ag) is included in an amount of 0.01 wt % to 15 wt %,
sodium (Na) is included in an amount of 0.01 wt % to 25 wt %,
barium (Ba) is included in an amount of 15 wt % to 45 wt %,
calcium (Ca), if present, is included in an amount of 15 wt % to 45 wt %,
strontium (Sr), if present, is included in an amount of 15 wt % to 45 wt %,
boron (B) is included in an amount of 15 wt % 25 wt %,
zinc (Zn) is included in an amount of 1 wt % to 15 wt %,
tin (Sn) is included in an amount of 0.01 wt % to 15 wt %,
copper (Cu) is included in an amount of 0.01 wt % to 15 wt %,
indium (In) is included in an amount of 0.01 wt % to 15 wt %,
titanium (Ti) is included in an amount of 0.01 wt % to 15 wt %,
phosphorus (P) is included in an amount of 0.01 wt % to 15 wt %,
manganese (Mn) is included in an amount of 0.01 wt % to 15 wt %,
and germanium (Ge) is included in an amount of 0.01 wt % to 15 wt %.

8. The multilayer ceramic capacitor of claim 1, wherein the glass is included in an amount of 1 parts by weight to 40 parts by weight based on 100 parts by weight of the conductive metal.

9. The multilayer ceramic capacitor of claim 1, wherein an average particle diameter D50 of the glass is 0.1 μm to 5 μm.

10. The multilayer ceramic capacitor of claim 1, wherein the conductive metal includes copper (Cu), nickel (Ni), silver (Ag), palladium (Pd), gold (Au), platinum (Pt), tin (Sn), tungsten (W), titanium (Ti), lead (Pb), an alloy thereof, or a combination thereof.

11. The multilayer ceramic capacitor of claim 3, wherein the conductive metal includes copper (Cu),
the glass is included in an amount of 1 parts by weight to 40 parts by weight based on 100 parts by weight of the conductive metal, and
the glass further includes lithium (Li), silicon (Si), aluminum (Al), nickel (Ni), silver (Ag), sodium (Na), barium (Ba), boron (B), zinc (Zn), tin (Sn), copper (Cu), indium (In), titanium (Ti), phosphorus (P), manganese (Mn), and germanium (Ge).

12. A method of manufacturing a multilayer ceramic capacitor, comprising:
applying a paste for forming an electrode layer to one surface of a capacitor body including a dielectric layer and an internal electrode layer, wherein the paste includes a conductive metal and glass composition; and
sintering the paste to form the electrode layer of an external electrode,
wherein the glass composition includes cobalt oxide (CoO) in an amount of 0.13 parts by weight to 0.64 parts by weight based on 100 parts by weight of the conductive metal.

13. The method of manufacturing the multilayer ceramic capacitor of claim 12, wherein
the sintering is performed at a temperature of 400° C. to 850° C.

14. The method of manufacturing the multilayer ceramic capacitor of claim 12, wherein
the glass composition further includes iron oxide,
and the iron oxide includes FeO, $Fe_2O_3$, $Fe_3O_4$, or a combination thereof.

15. The method of manufacturing the multilayer ceramic capacitor of claim 14, wherein
iron oxide is included in an amount of 0.18 parts by weight to 0.91 parts by weight based on 100 parts by weight of the conductive metal.

16. The method of manufacturing the multilayer ceramic capacitor of claim 12, wherein
the glass composition further includes lithium oxide ($Li_2O$); potassium oxide ($K_2O$); silicon dioxide ($SiO_2$); aluminum oxide ($Al_2O_3$); nickel oxide (NiO); silver oxide ($Ag_2O$); sodium oxide (NaO); barium oxide (BaO); calcium oxide (CaO); strontium oxide (SrO); boron oxide ($B_2O_3$); zinc oxide (ZnO); tin oxide including SnO, $SnO_2$, or a combination thereof; copper oxide including $Cu_2O$, CuO, or a combination thereof; indium oxide ($In_2O_3$); titanium dioxide ($TiO_2$); phosphorus pentoxide ($P_2O_5$); manganese oxide including MnO, $Mn_2O$, $Mn_2O_3$, $Mn_3O_4$, or a combination thereof; germanium oxide ($GeO_2$); or a combination thereof.

17. The method of manufacturing the multilayer ceramic capacitor of claim 16, wherein
based on a total amount of the glass composition,
lithium oxide ($Li_2O$) is included in an amount of 5 wt % to 20 wt %, potassium oxide (K$_2$O), if present, is included in an amount of 5 wt % to 20 wt %,
silicon dioxide (SiO$_2$) is included in an amount of 5 wt % to 20 wt %,
aluminum oxide (Al$_2$O$_3$) is included in an amount of 5 wt % to 15 wt %,
nickel oxide (NiO) is included in an amount of 0.01 wt % to 20 wt %,
silver oxide (Ag$_2$O) is included in an amount of 0.01 wt % to 15 wt %,
sodium oxide (NaO) is included in an amount of 0.01 wt % to 25 wt %,
barium oxide (BaO) is included in an amount of 15 wt % to 45 wt %,
calcium oxide (CaO), if present, is included in an amount of 15 wt % to 45 wt %,
strontium oxide (SrO), if present, is included in an amount of 15 wt % to 45 wt %,
boron oxide (B$_2$O$_3$) is included in an amount of 15 wt % to 25 wt %,
zinc oxide (ZnO) is included in an amount of 1 wt % to 15 wt %,
tin oxide is included in an amount of 0.01 wt % to 15 wt %,
copper oxide is included in an amount of 0.01 wt % to 15 wt %,
indium oxide (In$_2$O$_3$) is included in an amount of 0.01 wt % to 15 wt %,
titanium dioxide (TiO$_2$) is included in an amount of 0.01 wt % to 15 wt %,
phosphorus pentoxide (P$_2$O$_5$) is included in an amount of 0.01 wt % to 15 wt %,
manganese oxide is included in an amount of 0.01 wt % to 15 wt %,
and germanium oxide (GeO$_2$) is included in an amount of 0.01 wt % to 15 wt %.

18. The method of manufacturing the multilayer ceramic capacitor of claim 12, wherein
the glass composition is included in an amount of 1 parts by weight to 40 parts by weight based on 100 parts by weight of the conductive metal.

19. The method of manufacturing the multilayer ceramic capacitor of claim 12, wherein
the conductive metal includes copper (Cu), nickel (Ni), silver (Ag), palladium (Pd), gold (Au), platinum (Pt), tin (Sn), tungsten (W), titanium (Ti), lead (Pb), an alloy thereof, or a combination thereof.

20. The method of manufacturing the multilayer ceramic capacitor of claim 15, wherein
the conductive metal includes copper (Cu),
the glass composition is included in an amount of 1 parts by weight to 40 parts by weight based on 100 parts by weight of the conductive metal, and
the glass composition further includes lithium oxide (Li$_2$O); silicon dioxide (SiO$_2$); aluminum oxide (Al$_2$O$_3$); nickel oxide (NiO); silver oxide (Ag$_2$O); sodium oxide (NaO); barium oxide (BaO); boron oxide (B$_2$O$_3$); zinc oxide (ZnO); tin oxide including SnO, SnO$_2$, or a combination thereof; copper oxide including Cu$_2$G, CuO, or a combination thereof; indium oxide (In$_2$G$_3$); titanium dioxide (TiO$_2$); phosphorus pentoxide (P$_2$O$_5$); manganese oxide including MnO, Mn$_2$O, Mn$_2$O$_3$, Mn$_3$O$_4$, or a combination thereof; and germanium oxide (GeO$_2$).

* * * * *